Feb. 27, 1962    R. P. BURR ET AL    3,023,334
PRINTED CIRCUIT ARMATURE
Filed May 25, 1959    3 Sheets-Sheet 1
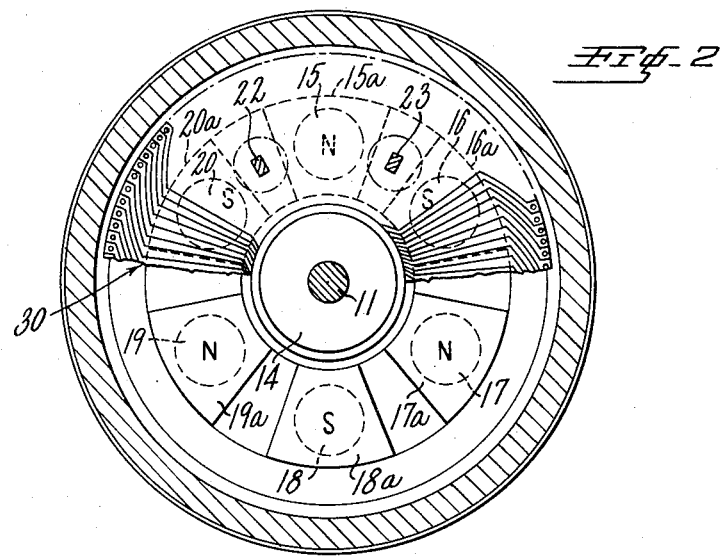
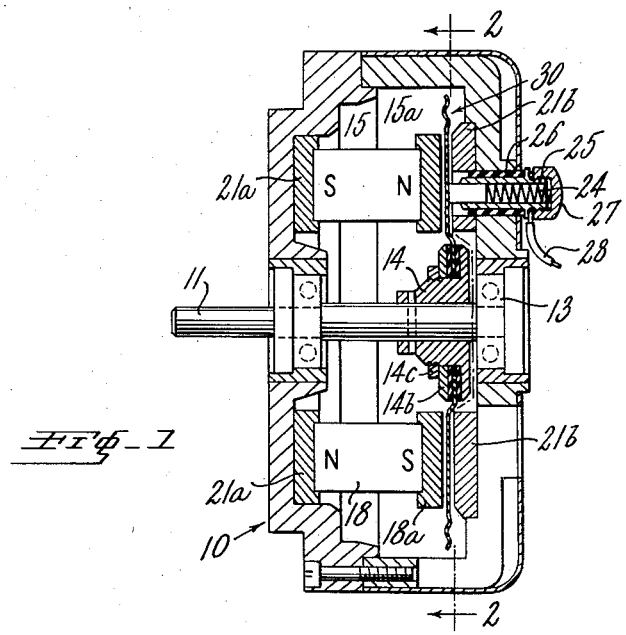
INVENTORS
ROBERT P. BURR
RAYMOND J. KEOGH
BY
Charles A. Blank
ATTORNEY

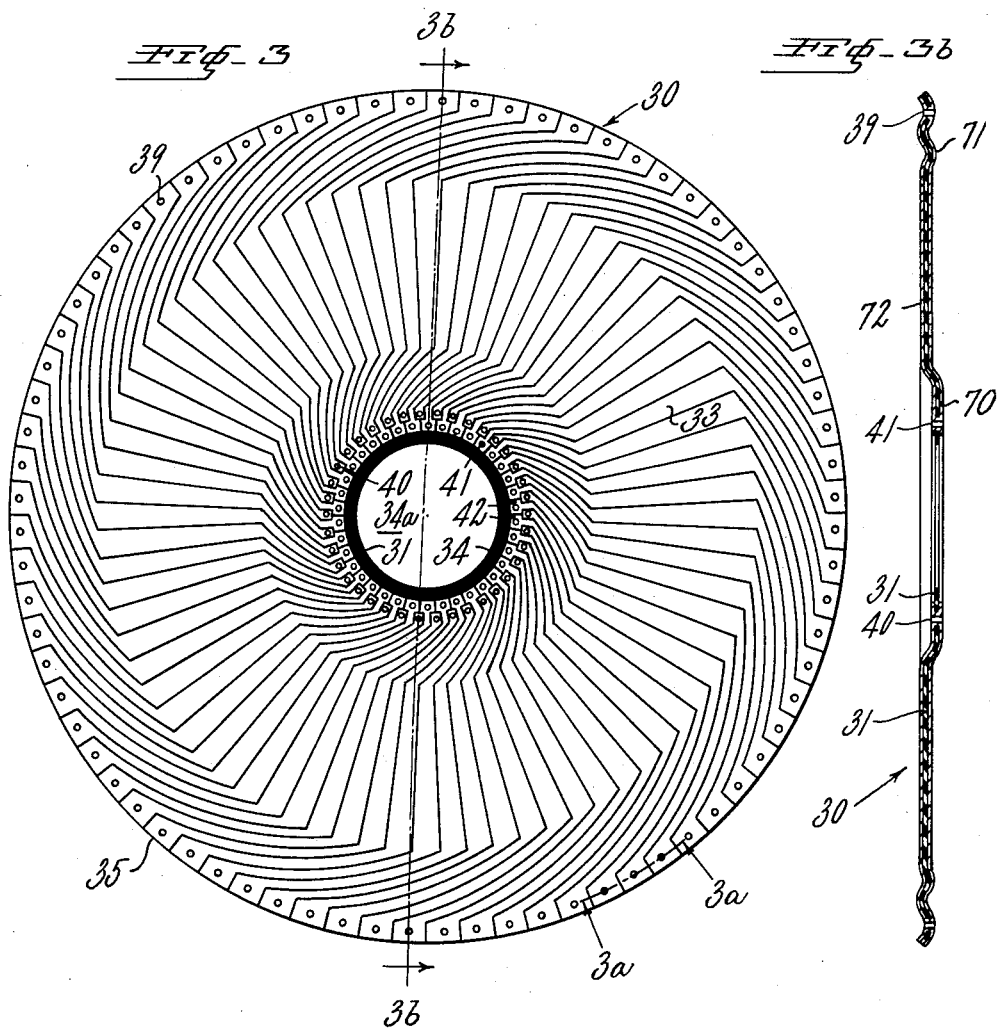
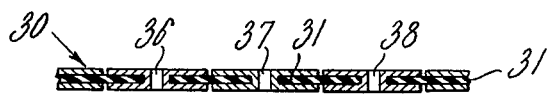

Feb. 27, 1962   R. P. BURR ET AL   3,023,334
PRINTED CIRCUIT ARMATURE
Filed May 25, 1959   3 Sheets-Sheet 3
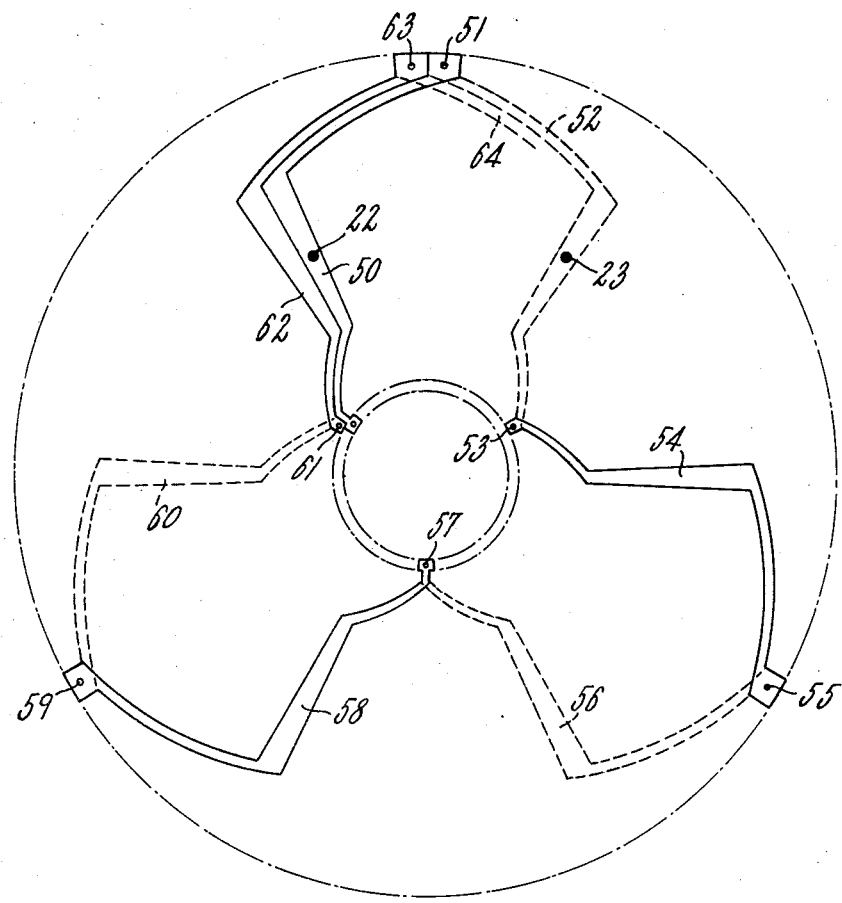
_Fig. 4_
INVENTORS
ROBERT P. BURR
RAYMOND J. KEOGH
BY
Charles A. Blank
ATTORNEY

United States Patent Office 3,023,334
Patented Feb. 27, 1962

3,023,334
PRINTED CIRCUIT ARMATURE
Robert P. Burr and Raymond J. Keogh, Huntington, N.Y., assignors to Printed Motors, Inc., New York, N.Y., a corporation of New Jersey
Filed May 25, 1959, Ser. No. 815,532
6 Claims. (Cl. 310—268)

This invention relates to armatures for electrical rotating machines and, more particularly, to armatures for direct-current motors and generators. The invention is particularly directed to armatures having printed-circuit, plated or etched conductors.

Electrical rotating machines utilizing printed-circuit armatures are described and claimed in the co-pending application Serial No. 691,434, filed October 21, 1957, by F. H. Raymond and J. Henry-Baudot. Printed-circuit armatures suitable for use in electrical rotating machines are also described and claimed in a co-pending application Serial No. 792,733, entitled "Conductive Device," filed February 12, 1959, by Robert L. Swiggett, now Patent 2,970,238. In the aforesaid applications, armatures are described having conductive patterns coated on the faces of a sheet of insulating material sufficiently thick to support the patterns or supported by a second insulating member adherent to one of the patterns. While such armatures provide satisfactory operation over a wide range of operating conditions, under heavy load conditions they may over-heat. Differences in the rate of expansion of the conductive and insulating materials may distort the insulating member of the armature beyond its elastic limit and cause permanent deformation of the armature under extreme operating conditions. During operation the deformed armature may undesirably rub against the pole pieces of the magnets of the motor.

It is an object of the present invention to provide for an electrical rotating machine a new and improved armature which is of low inertia.

It is another object of the invention to provide for an electrical rotating machine a new and improved armature which is of minimum thickness and yet is sufficiently rigid to operate satisfactorily under normal conditions.

It is another object of the invention to provide for an electrical rotating machine a new and improved armature which is subject to minimum deformation at high operating temperatures.

In accordance with the invention, an armature for an electrical rotating machine comprises a thin sheet of insulating material having surfaces coated with conductive patterns which have inner and outer boundaries and which have interconnections disposed in a plurality of rows near the boundaries. The aforesaid sheet has edge regions which are transversely displaced with respect to the plane of adjacent regions of the sheet for minimizing deformation of the sheet due to variations of operating temperature over a wide range.

For a better understanding of the present invention, together with other and further objects thereof, reference is made to the following description taken in connection with the accompanying drawings and its scope will be pointed out in the appended claims.

Referring to the drawings:

FIG. 1 is a sectional view along a central plane of a direct-current motor utilizing a printed-circuit armature constructed in accordance with the present invention with one of the brush mounts shown in section;

FIG. 2 is a sectional view taken along line 2—2 of FIG. 1, with the armature partly broken away;

FIG. 3 is a plan view of the armature utilized in the FIG. 1 motor;

FIG. 3a is an enlarged sectional view taken along line 3a—3a of FIG. 3;

FIG. 3b is a sectional view of the FIG. 3 armature, taken along line 3b—3b of FIG. 3; and FIG. 4 is a fragmentary plan view of the armature to represent conductive patterns on both sides of the armature.

Referring now more particularly to FIG. 1 of the drawings, the direct-current motor there represented comprises a motor housing 10 supporting a central shaft 11 journaled in suitable bearing 13. An armature 30 constructed in accordance with the invention is mounted on a suitable supporting hub 14 between insulating washers, a clamping ring 14b and threaded nut 14c. As is apparent in FIG. 2, the motor is, for example, a six-pole motor utilizing six permanent magnets, 15 to 20, inclusive, to establish a magnetic field. Suitable pole pieces 15a to 20a, inclusive, are attached to the magnets at one end as represented in FIG. 2. An annulus 21a of ferromagnetic material is attached to the other end of the magnets to provide a path for magnetic flux. The magnets are mounted to provide fields of alternate polarity through adjacent regions of the armature as represented by the north-south symbols N–S of FIGS. 1 and 2. A ferromagnetic annulus 21b, is positioned on the other side of the armature from the magnets to minimize the air gap in the magnetic field and to complete the path for magnetic flux. Suitable brushes 22, 23, represented in section in FIG. 2, are positioned approximately midway between magnets 20 and 15 and between magnets 15 and 16 to supply current to the motor, as will be described in detail subsequently.

Referring to FIG. 1, brush 23 is maintained in position by a suitable spring 24 mounted in a sleeve 25 within an insulating support 26. A cap of insulating material 27 is threaded on the sleeve 25 for clamping an electrical lead 28 thereto. The brush 22, and a corresponding electrical lead (not shown) are similarly mounted and connected electrically.

Referring now more particularly to FIG. 3 of the drawings, the armature 30 constructed in accordance with the invention is represented in plan view. The armature comprises an insulating member having surfaces coated with conductive patterns preferably having substantially circular inner and outer boundaries and which have interconnections preferably comprising conductive coatings bounding apertures through the insulating member disposed in a plurality of circular rows in the patterns near the boundaries. More particularly, the insulating member preferably comprises a suitable sheet material such as Mylar, which is a commercially available polyester film made by E. I. du Pont de Nemours & Company, Inc., or a sheet of epoxy-glass laminate. The insulating sheet 31 is apparent in FIG. 3a which is a sectional view of a portion of the armature along line 3a—3a of FIG. 3. The insulating sheet preferably has a thickness of, for example, .005 inch. The insulating sheet is also represented by the lines representing conductor boundaries in FIG. 3. The conductive pattern represented in FIG. 3 is repeated on the other side of the sheet 31, as partially represented in FIG. 4, which is a fragmentary view of the armature and its conductive patterns. Thus, the armature pattern on each side of the sheet 31 appears as represented in FIG. 3, when each pattern is viewed from the side of the sheet 31 on which that pattern appears. The radial portions 33 of the conductors on both sides of the armature may coincide. The conductor patterns will be described in detail subsequently. The armature may, for example, be 3.6 inches in diameter and comprise 76 conductors in the conductive pattern on each surface.

The insulating sheet 31 has a centrally located aperture 34a for mounting the armature on the hub 14 of FIG. 1.

The conductive patterns preferably have substantially circular inner and outer boundaries 34 and 35. Interconnections between the conductive patterns comprise conductive coatings, for example, 36, 37, and 38 of FIG. 3a, bounding apertures through the insulating material and disposed in a plurality of substantially circular rows 39, 40 and 41 near the boundaries. The interconnections in the outermost circle 39 are connected to all conductors of the conductive patterns. The interconnections in the innermost circle 41 are connected to alternate conductors in each conductive pattern. The interconnections in the other inner circle 40 are connected to conductors intervening the alternate conductors in the conductive patterns. The alternate conductors connected to the innermost circle 41 are terminated in closely spaced adjacent conductive regions 42, 42 separated by insulating material. The intervening conductors are terminated on each face of the sheet 31 by conductive regions separated by the alternate conductors and insulating material.

Thus it will be seen in FIG. 3 that alternate connections to the conductors are staggered, that is, connections to alternate conductors are in the innermost circle 41 and connections to the intervening conductors are in the adjacent circle 40, preferably midway between the apertures of circle 41. This construction of the armature is of importance because it provides substantial regions of the conductors in which coated apertures are located. The apertures may, therefore, be of substantial size, for example, .02 inch on a circle of .7 inch diameter, permitting a coating of sufficient thickness and area to conduct the necessary current. This construction of the conductors with the apertures arranged in a plurality of circular rows near the central aperture 34a makes the manufacture of small armatures commercially practical.

The conductor pattern and the corresponding pattern for current flow through the armature will be partially traced with reference to FIG. 4. Assuming current to enter the motor at brush 22 disposed in contact with conductor 50, current flows along conductor 50 through aperture 51 to conductor 52 on the other side of the insulating sheet, through aperture 53 along conductor 54, through aperture 55 along conductor 56 on the other side of the insulating sheet, through aperture 57 along conductor 58, through aperture 59 along conductor 60 on the other side of the insulating sheet, and through aperture 61 along conductor 62 adjacent conductor 50. Current continues along conductor 62 through aperture 63 along conductor 64 on the other side of the insulating sheet adjacent conductor 52. Current flow continues in this manner through the conductors of the armature until it reaches the final conductor (not shown) on the face of the same sheet as conductor 50 and directly under brush 23.

Referring to FIGS. 3 and 3b, the sheet 31 has edge regions 70, 71 which are transversely displaced with respect to the plane of adjacent regions 72, 72 of the sheet for minimizing deformation of the sheet due to variations of operating temperature over a wide range and imparting to the sheet a sufficient structural rigidity to operate satisfactorily under normal operating conditions. More particularly, the sheet 31 has a ridged outer edge 71 with corrugations in the non-radial regions of the conductors 33. The inner edge region 70 forms a transversely displaced rim with respect to the plane of the radial regions of the conductors 33. The transverse dimension or depth of the corrugations in edge 71 and the displacement of the rim 70 may, for example, each be of the order of 1/16 inch normal to the plane of the armature. The radial dimension or width of the corrugations in the plane of the armature may, for example, be of the order of 1/8 inch and the width of the rim 71 may also be of that order of magnitude.

A method of manufacturing the armature will be briefly described. A sheet of Mylar is drilled, perforated or punched to form apertures in the pattern represented in FIG. 3. The sheet is then coated with a copper film on all exposed surfaces, including the walls of the apertures, to a thickness of approximately .00001 inch by immersion in an electroless copper deposition solution ordinarily employed in the manufacture of printed circuits. The copper-coated faces are then coated with a suitable screen printing-ink plating resist, known to the art, which resists copper electroplating and which is printed on the copper to form the pattern to be etched, represented by the black lines of FIG. 3. The armature is then copper-plated on its faces and through its apertures. After plating to the desired copper thickness (for example, approximately .005 for a three inch diameter armature), the part is removed from the electroplating bath and the ink is cleaned off, leaving exposed the thin electroless copper film which was under the ink. The armature is then immersed briefly in an etching solution, which removes the thin electroless copper film which was under the ink to form the conductors represented in FIG. 3.

It should also be understood that the conductive coating on the surfaces of the insulating sheet may comprise, for example, a copper-foil material which is laminated to the insulating sheet and is subsequently etched. Also, the conductively coated apertures through the insulating material may be filled with conductive or insulating material, if desired.

The coated sheet may then be formed in a suitable die (not shown) to impart the corrugations to the sheet. During the pressing operation in the die, the sheet may be heated to a temperature of, for example, 300° F. The heating of the coated sheet is not essential during the forming operation, since, without heating, the corrugations impart structural rigidity to the sheet and extend substantially the temperature range of satisfactory operation without resulting deformation of the armature. However, we have found that heating the coated sheet during the forming operation aids in minimizing any tendency for subsequent deformation of the armature during operation of the motor.

From the foregoing description it will be apparent that an armature constructed in accordance with the invention has the advantage of being of low inertia because it is extremely thin. The armature also has the advantage that it is sufficiently rigid to operate satisfactorily under normal conditions and is subject to minimum deformation at high operating temperatures.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. An armature for an electrical rotating machine comprising: a thin sheet of insulating material having surfaces coated with conductive patterns which have inner outer boundaries and which have interconnections disposed in a plurality of rows near said boundaries, said sheet having an edge region which is transversely displaced with respect to the plane of an adjacent region of said sheet for minimizing deformation of said sheet due to variations of operating temperature over a wide range.

2. An armature for an electrical rotating machine comprising: a thin sheet of insulating material having surfaces coated with conductive patterns which have inner and outer boundaries and which have interconnections comprising conductive coatings bounding apertures through said insulating material disposed in a plurality of rows near said boundaries, said sheet having a transversely ridged outer edge region for minimizing deformation of said sheet due to variations of operating temperature over a wide range.

3. An armature for an electrical rotating machine comprising: a thin sheet of insulating material having surfaces coated with conductive patterns which have inner and outer boundaries and which have interconnections disposed in a plurality of rows near said boundaries, said sheet having a corrugated outer edge region for minimizing deformation of said sheet due to variations of operating temperature over a wide range.

4. An armature for an electrical rotating machine comprising: a thin sheet of insulating material having surfaces coated with conductive patterns which have substantially circular inner and outer boundaries and which comprise groups of individual conductors with regions of substantially radial configuration and which have interconnections between conductors comprising conductive coatings bounding apertures through said insulating material disposed in a plurality of substantially circular rows in said patterns near said boundaries, said sheet having ridges in outer edge regions for minimizing deformation of said sheet due to variations of operating temperature over a wide range.

5. An armature for an electrical rotating machine comprising: a thin sheet of insulating material having a centrally located aperture of substantially circular boundary and having surfaces coated with conductive patterns which have substantially circular inner and outer boundaries and which comprises groups of individual conductors with regions of substantially radial configuration and which have interconnections between conductors comprising conductive coatings bounding apertures through said insulating material disposed in a plurality of substantially circular rows near said boundaries, said sheet having ridges in outer edge regions and having an inner rim adjacent said aperture which is transversely displaced with respect to the plane of the radial regions of said conductors for minimizing deformation of said sheet due to variations of operating temperature over a wide range.

6. An armature for an electrical rotating machine comprising: a thin sheet of insulating material having a centrally located aperture of substantially circular boundary and having surfaces coated with conductive patterns which have substantially circular inner and outer boundaries and which comprise groups of individual conductors with central regions of substantially radial configuration and which have interconnections between conductors comprising conductive coatings bounding apertures through said insulating material disposed in a plurality of substantially circular rows near said boundaries, said sheet having ridges at inner and outer edge regions with respect to the plane of the central radial region of said conductors for minimizing deformation of said sheet due to variations of operating temperature over a wide range.

References Cited in the file of this patent

"Printed Circuit Armature," Electronic Design, March 4, 1959.

UNITED STATES PATENT OFFICE
CERTIFICATE OF CORRECTION

Patent No. 3,023,334                          February 27, 1962

Robert P. Burr et al.

It is hereby certified that error appears in the above numbered patent requiring correction and that the said Letters Patent should read as corrected below.

In the grant, line 3, and in the heading to the printed specification, line 5, for "a corporation of New Jersey", each occurence, read -- a corporation of Delaware --; column 4, line 58, after "inner" insert -- and --.

Signed and sealed this 26th day of June 1962.

(SEAL)
Attest:

ERNEST W. SWIDER
Attesting Officer

DAVID L. LADD
Commissioner of Patents